United States Patent [19]
Hayes et al.

[11] Patent Number: 5,564,112
[45] Date of Patent: Oct. 8, 1996

[54] SYSTEM AND METHOD FOR GENERATING PLACE HOLDERS TO TEMPORARILY SUSPEND EXECUTION OF A SELECTED COMMAND

[75] Inventors: Barry Hayes, Hawthorne, N.Y.; Aaron Goodisman, Brookline, Mass.

[73] Assignee: Xerox Corporation, Stamford, Conn.

[21] Appl. No.: 136,360

[22] Filed: Oct. 14, 1993

[51] Int. Cl.$^6$ .................................................. G06F 15/00
[52] U.S. Cl. ........................................... 395/155; 395/161
[58] Field of Search ...................... 395/155–161, 395/118, 133, 600, 650; 345/117–120, 173–179, 180, 181, 183

[56] References Cited

U.S. PATENT DOCUMENTS

| | | | |
|---|---|---|---|
| 4,727,588 | 2/1988 | Fox et al. | 382/13 |
| 4,823,283 | 4/1989 | Diehm et al. | 364/518 |
| 4,912,628 | 3/1990 | Briggs | 364/200 |
| 4,923,401 | 5/1990 | Marshall et al. | 345/179 |
| 5,045,880 | 9/1991 | Evanitsky et al. | 345/173 |
| 5,053,758 | 10/1991 | Cornett et al. | 345/173 |
| 5,202,961 | 4/1993 | Mills et al. | 395/159 |
| 5,237,647 | 8/1993 | Roberts et al. | 395/119 |
| 5,243,697 | 9/1993 | Hoeber et al. | 395/156 |
| 5,315,703 | 5/1994 | Matheny et al. | 395/155 |
| 5,317,732 | 5/1994 | Gerlach, Jr. et al. | 395/159 |

OTHER PUBLICATIONS aha! InkWriter Quick Reference Guide and Handbook, aha! Software Corporation, Copyright 1993.

"Symbolic Construction of a 2-D Scale-Space Image," Eric Saund, IEEE Transactions on Pattern Analysis and Machine Intelligence, Aug. 1990, vol. 12, No. 8.

"Issues in Combining Marking and Direct Manipulation Techniques", Gordon Kurtenbach and William Buxton, Nov. 11–13, UIST 1991, pp. 137–144.

Screen Dumps From "Microsoft® Excel", Microsoft Corporation, 1985–1992, pp. 1–16.

*Primary Examiner*—Mark R. Powell
*Assistant Examiner*—U. Chauhan
*Attorney, Agent, or Firm*—Rosen, Dainow & Jacobs, Limited Liability Partnership

[57] ABSTRACT

A graphical editing system is provided which creates a "place-holder" that holds or suspends a complex gesture or complex menu selection before committing to the command. Such a place-holder acts as a virtual stylus, i.e. as if the user was actually holding the stylus to the screen just prior to committing to the command. The virtual stylus thus allows the user to execute other arbitrary drawings or menu commands or gestures while the original complex command is suspended. The user can then return to the complex command he/she chooses and remove the place-holder to commit to the command or cancel the command if desired. The virtual stylus can take on many forms, e.g., a hand with a pointed finger, an icon or any other desired indicator, and the virtual stylus can be created by any user action, e.g., an actuated stylus button, pressure sensitive display surface or by sensing the time during which the stylus remains stationary on the display screen. The virtual stylus can be removed in basically the same way.

29 Claims, 7 Drawing Sheets

SYSTEM AND METHOD FOR GENERATING PLACE HOLDERS TO TEMPORARILY SUSPEND EXECUTION OF A SELECTED COMMAND

This application is related to Ser. No. 07/869,554, filed Apr. 15, 1992, Ser. No. 07/869,559, filed Apr. 15, 1992, U.S. Pat. No. 5,404,439, Ser. No. 08/101,646, fled Aug. 4, 1993, Ser. No. 08/101,645, filed Aug. 4, 1993, U.S. Pat No. 5,485,565, all assigned to the present assignee, the disclosures of which are in their entirety, each specifically incorporated by reference herein.

FIELD OF THE INVENTION

This invention pertains to an information input system and method and more particularly to a "touch based" graphical input system that receives information by touching a stylus, pen, finger or the like to an input surface.

BACKGROUND OF THE INVENTION

Computer graphic operations that are initiated by pointing devices are typically two types: command drawing operations and control operations. Drawing operations describe loci for the placement of visible marks on the image, analogous to drawing on a piece of paper by making a motion with a pen in contact with the surface. Control operations are used to initiate and guide the execution of computer functions leading to modification of the visible marks. Control operations are especially important to the performance of editing functions such as erasing, moving, or changing the visual qualities (e.g. line width) of visible marks of the image.

In a touch based input system, such control :functions are usually instituted by a menu or by a gesture command via a pointing device such as a stylus. A visible menu is either located on a specified area of a display or appears near the stylus position when desired. In order to institute a simple command from a menu, the user moves to a desired item and selects it by pressing or lifting a button on the pointing device if one were present on the device or by some other means if an ordinary pen were used. If the user does not wish to commit to a control command operation, i.e., issue any item on the menu, the user can move the pointing device off of the menu before issuing the command or move the stylus to a "cancel" selection and lift the stylus from the display. In order to institute a simple control command by gesture, the user would draw a gesture that represents some desired function and then commit to this command by lifting the input device (e.g. stylus) or a button on the device (e.g. mouse).

The commands described above however are control operations for implementing simple desired functions. Most often times user applications require complicated, i.e. complex control commands such as are shown in FIGS. 6a and 6b which entail multiple menu and sub-menus trees or highly detailed command gestures. FIG. 6a illustrates a multiple pie menu and sub-menu and FIG. 6b illustrates a multiple pull-down menu and sub-menu arrangement. In FIGS. 6a and 6b, for example, the desired function "delete" item may be located in a fourth pop-up sub-menu.

In this situation as well as many others, to save time, it would be advantageous to "hold" the complex control menu or gesture command and move within the same application program or to another program to verify that the information chosen to be deleted is actually the correct information desired. That is, it would be advantageous for a user to be able to suspend a complex menu command or command gesture before committing, perform other arbitrary commands, and then resume the suspended gesture. At present, the user must remove the complex menu command or the command gesture to perform other arbitrary commands and then return to redraw the complex gesture command or retrace the complex menu command previously desired.

One way to obtain such an advantage is to use multiple styli and concurrent commands. In such a system a user may touch a screen, draw some complex command gesture or evoke some complex menu command while maintaining contact with the screen and touch another part of the screen with a second stylus. For example, the user can begin a command gesture such as "delete file" with one stylus and hold it in place to avoid committing the command by removing the stylus. By using the second stylus to enter other commands such as "list file" the user can verify that the correct file is being deleted. Once verified the first stylus can be removed from the display surface to commit to the command. Multiple styli manipulation is neither easy nor practical.

Accordingly, it is desirable to employ a single stylus to overcome the disadvantages with multiple styli.

OBJECTS AND SUMMARY OF THE INVENTION

It is an object of the present invention to overcome the disadvantages described above using multiple styli.

Another object of the present invention is to allow a user to suspend a complex command gesture or menu command created by a stylus based input, perform another function by gesture or menu and then resume the suspended command gesture or menu command.

The above objects are achieved in accordance with the present invention by a graphical editing system that creates a "place-holder" which holds or suspends a complex gesture or complex menu selection before committing to the command. Such a placeholder acts as a virtual stylus, i.e. as if the user was actually holding the stylus to the screen just prior to committing to the command. The virtual stylus thus allows the user to execute other arbitrary drawings or menu commands or gestures while the original complex command is suspended. The user can then return to the complex command he/she chooses and remove the place-holder to commit to the command or cancel the command if desired.

The virtual stylus can take on many forms, e.g., a hand with a pointed finger, an icon or any other desired indicator, and the virtual stylus can be created by any user action, e.g., an actuated stylus button, pressure sensitive display surface or preferably by sensing the time at which the stylus remains stationary on the display screen. The virtual stylus can be removed in basically the same ways.

In accordance with an aspect of the invention, a graphic editing system is provided which comprises a data interface surface having identifiable coordinates, a first application program including means for displaying data on said surface, first means interacting with said surface to control said first application and to modify said data displayed on said surface, second means responsive to interacting of said first means with said surface for storing coordinates of said interaction and for suspending control of said first application program, and third means responsive to subsequent interaction of said first means with said data surface at said coordinates for selectively enabling execution, clarification and cancellation of said control of said first application program.

In accordance with one aspect of the present invention, a graphic editing system is provided which comprises a data interface surface having identifiable coordinates, a first application program including means for displaying data on said surface, first means interacting with said surface for controlling said first application and for modifying said data displayed on said surface, second means responsive to operation of said first means for storing coordinates of said interaction and for suspending control of said first application program, and third means responsive to subsequent interaction of said first means with said data surface at said coordinates for selectively enabling execution, clarification and cancellation of said control of said first application.

In accordance with another aspect of the invention, a graphic editing system is provided which comprises a data interface surface having identifiable coordinates, means for displaying data on said surface, a first means for interacting with said surface to modify said data on said surface, a second means responsive to said interaction for storing coordinates of said interaction and providing a visual identification of said coordinates of said interaction, and a means responsive to subsequent interaction of said first means with said data surface at said coordinates for removing said visual identification.

In accordance with another aspect of the invention, a graphic editing system is provided which comprises a data interface surface having identifiable coordinates, first and second application programs including means for selectively displaying first and second data respectively, on said data surface, a first means responsive to the display of said first data for interacting with said surface to control one of said first and second application programs currently displaying data on said surface and to modify said respective data on said surface, means responsive to said interaction for storing coordinates of said interaction with said data and providing a visual display of the location of said coordinates of said interaction. The means responsive to said interaction further comprises means enabling interaction of said first means with said data surface to control data on said surface corresponding to the data of said application program at coordinates different than said first mentioned coordinates for modifying said data thereat while retaining said stored coordinates of said interaction with said data of said one application program.

In accordance with another aspect of the invention, a graphic editing system is provided which comprises means for executing commands. The means includes (a) first means responsive to a first user action for selecting said one command, (b) second means responsive to a second user action to execute said one command, (c) third means responsive to a third user action immediately following the first user action to suspend execution of said one command and to allow the user to select a different command for execution, and (d) fourth means responsive to a fourth user action to restore the system to the same condition following execution of the first user action and capable of executing said one command.

BRIEF DESCRIPTION OF THE DRAWINGS

The invention is illustrated by way of example and not limited by the figures of the accompanying drawings in which like references denote like or corresponding parts and in which.

DESCRIPTION OF THE PREFERRED EMBODIMENT

Figure 1:
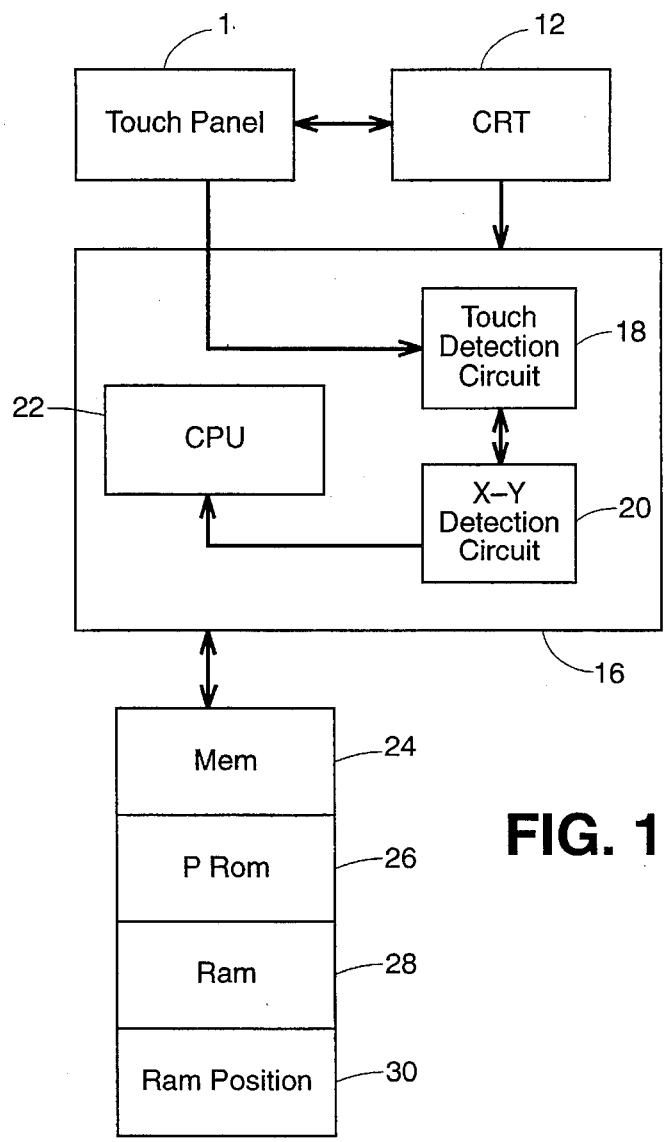
FIG. 1 is a block diagram illustrating one form of touch based input apparatus in which the invention can be employed.

Referring to FIG. 1, there is shown a block diagram of the touch based input system 10 including a CRT display 12. A transparent pressure sensitive type touch panel 14 is attached onto the surface of CRT display 12. Touch panel 14 is touched by a user and the touch is detected by touch detection circuit 18. A detection signal corresponding to the position of the touched input point is output from touch detection circuit 18 in a controller 16.

The detected signal from touch detection circuit 20 is input to an X-Y detection circuit 20. X-Y detection circuit 20 processes the input signal and performs an arithmetic operation or the like. Thus, the X-Y detection circuit 20 detects the (x, y) coordinates of the input point touched on the surface of touch panel 14 and transmits such information to CPU 22. Touch panel detection circuit 18, X-Y detection circuit 20 and the CPU 22 combine to form controller 16. Controller 16 performs the control in accordance with the control program stored in program ROM 26 in memory 24. ROM section in memory 24 includes program ROM 26 in which the control program of CPU 22 is stored and pattern data area to store various kinds of character patterns or the like. RAM section 28 of memory 24 includes a RAM portion which is used as a work area of CPU 22 and a character position data area 30 to store display positions of character patterns and the like.

Figure 2:
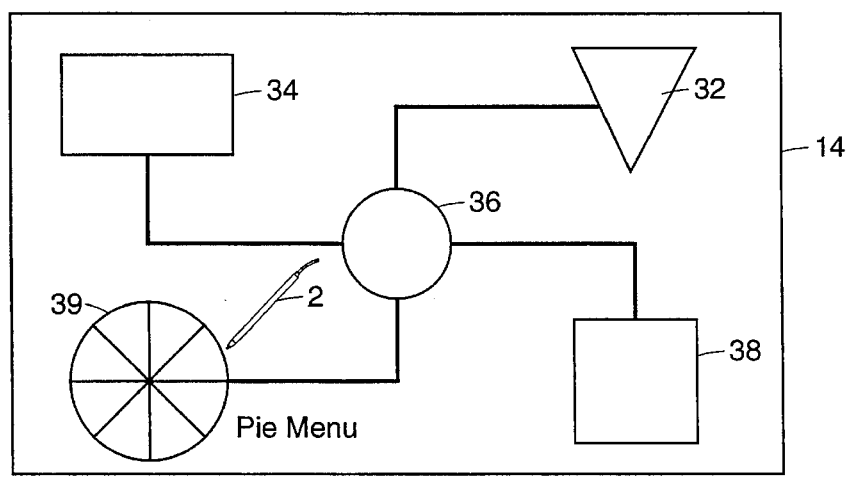
FIG. 2 is an elevational view of a screen display with several objects on display and software controlled pie menu.

FIG. 2 shows on CRT 12 several objects 32, 34, 36 and 38 created by a user drawing with the stylus 2 after activating the draw button from pie menu 39 also shown. The objects displayed can each consist of a single drawing stroke by the user while a pen switch is activated. Alternatively, when polygons, circles or other shapes are created, the entire shape can be treated as a single object.

Figure 3:
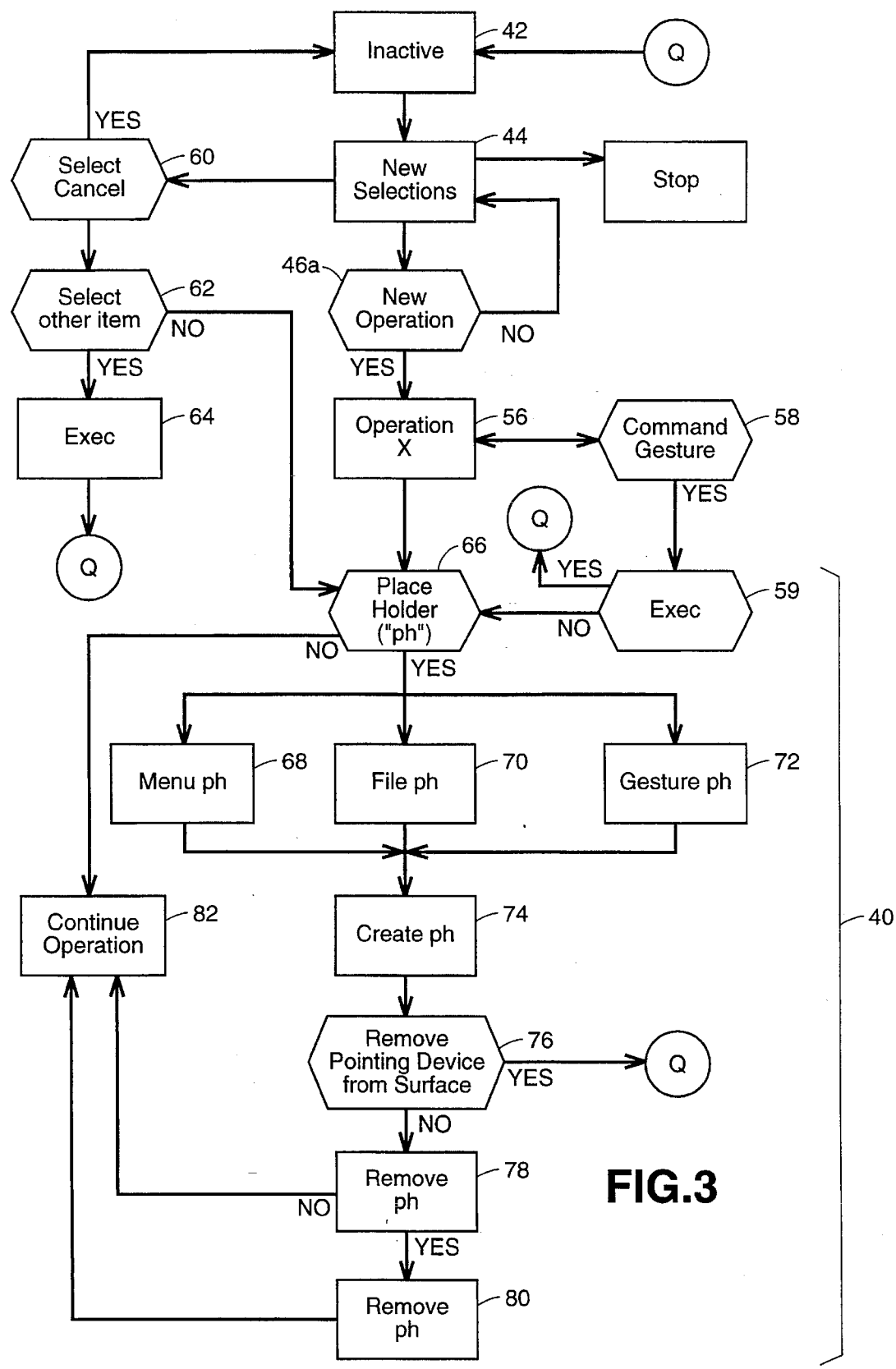
FIG. 3 is a flowchart illustrating general menu and file operation employing place-holder generation steps according to the present invention.
Figure 5:
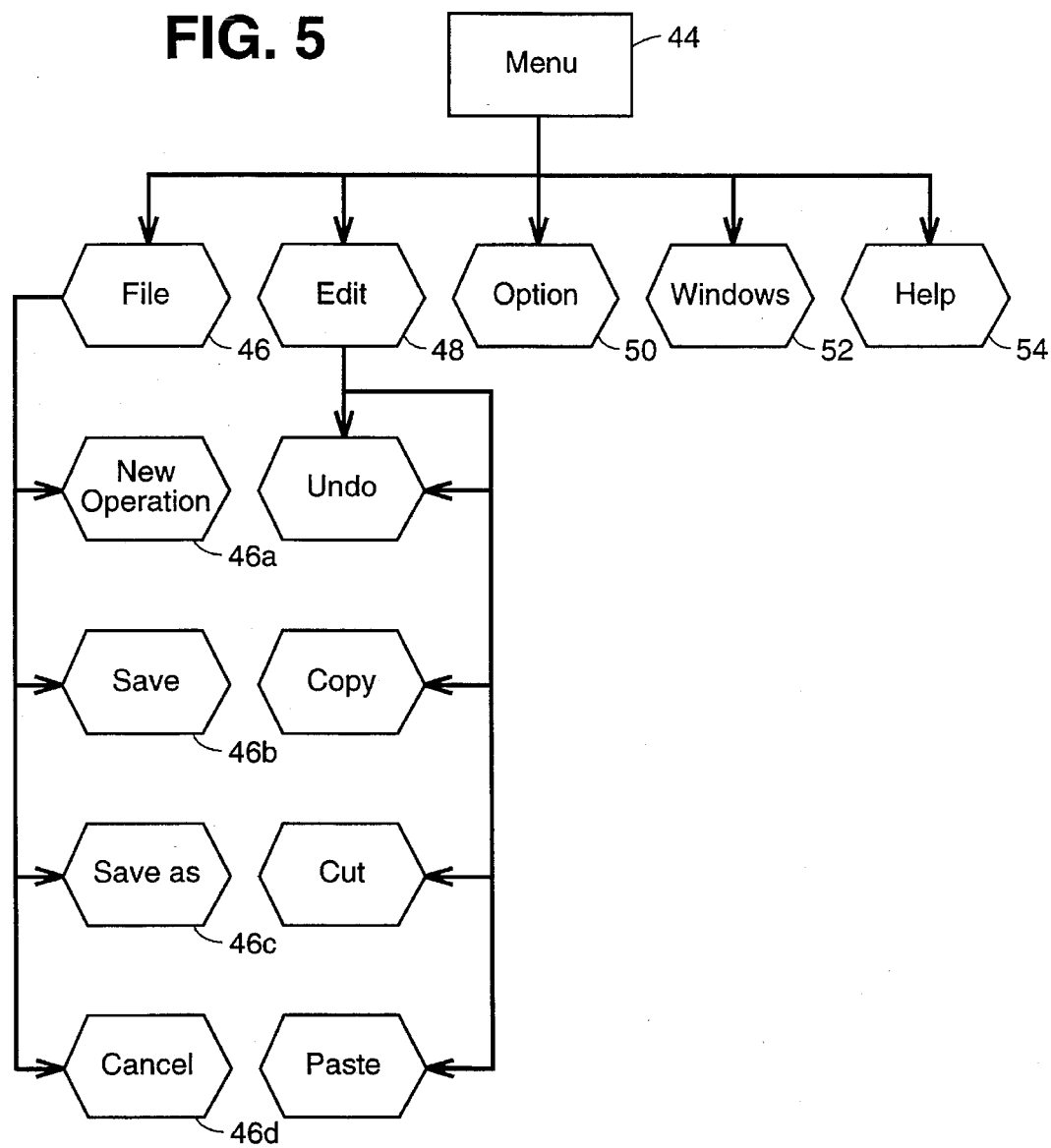
FIGS. 5 illustrates a flowchart of the various possible selectable items on the menu referred to in FIG. 3 in pie and pull-down form respectively.

Referring to FIG. 3 there is shown a flowchart illustrating general menu and file operations including place-holder creation steps noted generally as 40 according to the present invention. Inactive box 42 indicates that the touch panel 14 is inactive, i.e., touch panel receives no input from a user. This state may occur very often in touch based input system operation. This state however can go from inactive to active when the user touches the touch panel 14 with the pointing device at a desired menu command on the menu selection 44. The menu selection 44 usually consists of those selections listed in the menu and sub-menu selections shown in FIG. 5. FIG. 5 provides a number of possible menu and sub-menu choices. Some menu selections include FILE 46, EDIT 48, OPTION 50, WINDOW 52 AND HELP 54. Some sub-menu items under FILE 46 may include NEW OPERATION 46a, SAVE 46b, SAVE AS 46c, etc. However this list is not limited and may include many others. The user has the option of selecting NEW OPERATION 46a from a sub-menu under FILE 46 and executing operation (X) 56. During operation (X) the user can draw any desired object like that shown in FIG. 2 or draw a command gesture 58.

In order to commit to a command gesture drawn, the user usually need only lift the pointing device from the surface of the touch panel 14 and the command will be executed 59. If however the user draws a command gesture and wishes to "hold" or suspend the gesture to perform other operations, the user can create a place-holder at the point at which the pointing device is located on the touch panel 14. A place-holder is created by the steps generally noted by 40 and will be discussed below.

Alternatively, the user can select a menu or sub-menu item 62 from the menu-selection 44 and lift the pointing device from the surface of the touch panel 14 to commit to the command. Thus, the command is executed at 64. If however, the user selects an item 62 other than "cancel" 60 from menu selection 44 and wishes to suspend the menu command to perform other operations, the user can create a "place-holder" by the same steps shown at 40. In order to remove the place-holder earlier created (menu or gesture), the same steps are employed at 40.

As indicated above, a place-holder can be created by a user when a complex 21,0 command is chosen by menu or by gesture. In addition, a place-holder can be created at points throughout an individual file, e.g., at any point during object creation by the user. As can be seen in FIG. 3, the arrows leaving selected item choice 62, operation (X) 56, and execution choice 59 all lead to the place-holder choice 66. Obviously, the type of place-holder selected will depend upon the source of the arrow reaching place-holder choice 66. That is, the type of a place-holder created is defined or determined by whether the user desires to create a place-holder in a menu, gesture or application file. This is shown by boxes 68, 70, 72. The particular symbol chosen to represent a menu, file or gesture place-holder is not critical. Any symbol can be used. For example, a hand with a pointed index finger or an icon can be used.

If a user wants a place-holder at a desired location, then one will be created 74. The user may then remove 76 the pointing device from the surface of the touch panel 14 if he/she wishes and the touch panel 14 will be inactive 42. If the user does not choose to remove the pointing device, he/she can remove a place-holder 78 or continue with the previous operation 82. If the user chooses to remove the place-holder 78, the place-holder is removed and the user can continue with the previous operation 82.

Figure 4A:
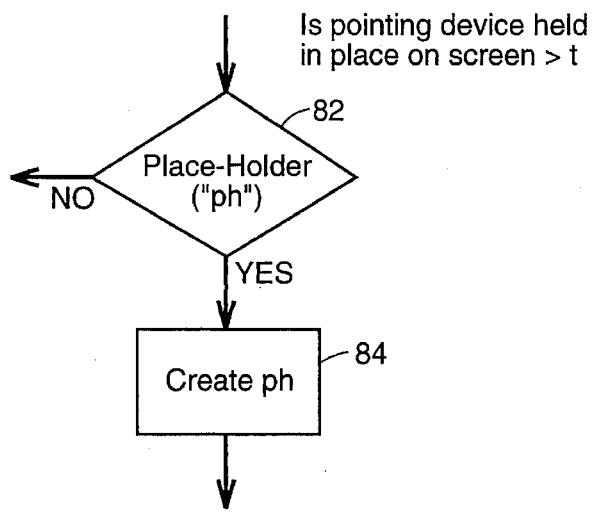
FIG. 4a–c are portions of the flowchart shown in FIG. 3 illustrating three specific embodiments including the preferred embodiment for creating a place-holder according to the present invention.
Figure 4B:
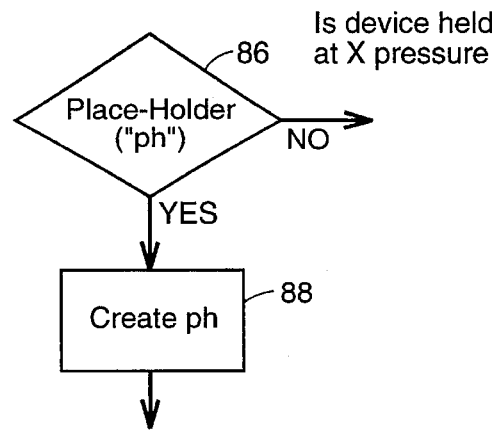
Figure 4C:
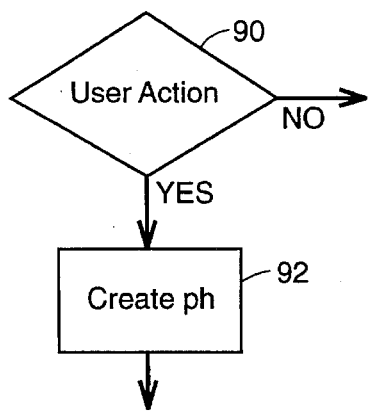

FIGS. 4a–c show three ways to create a place-holder. Each flowchart diamond choice in FIGS. 4a–c represent the combination of the following flowchart elements shown in FIG. 3: place-holder choice 66, boxes 68, 70, 72 and box 74. FIG. 4a illustrates the preferred method for creating a place-holder. In FIG. 4a, a place-holder is created 84 when the pointing device is held in place on the touch panel greater than a predetermined length of time (t) 82. In FIG. 4b, the touch panel 14 is caused to sense lo pressure from the pointing device on the surface of the touch panel 14. If pressure is sensed 86, a place-holder is created 88. In FIG. 4c, a place-holder is created by some user action 90. For example, a button on the pointing device actuated by the user will create 92 a place-holder. Any place-holder may be removed by any one of the methods described above.

Figure 6A:
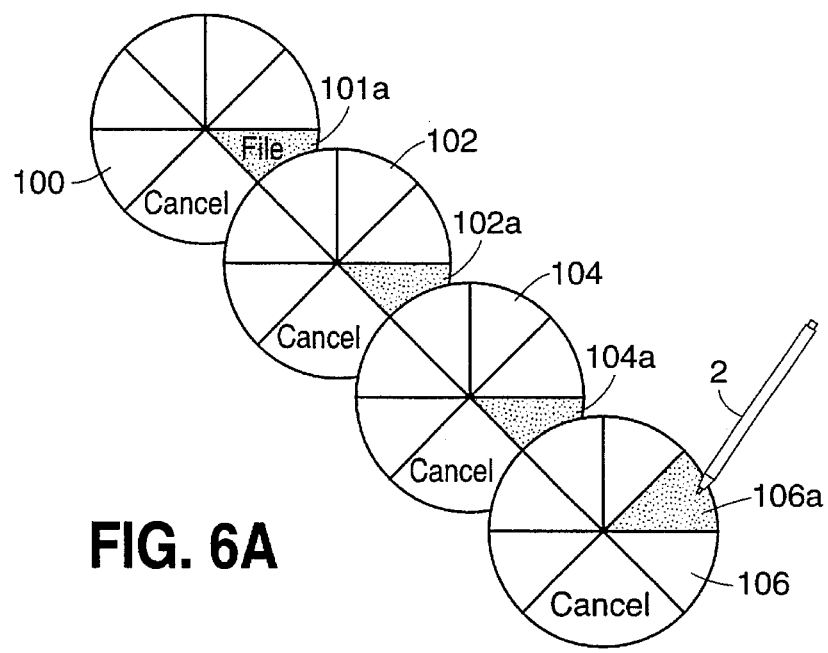
FIG. 6a and 6b illustrate a complex command in a pie and pull-down menu respectively.
Figure 6B:
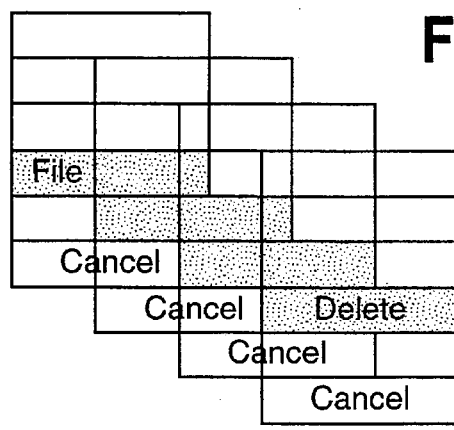

FIGS. 6a and 6b illustrate an example of a complex command in pie and pull-down menus respectively. In FIG. 6a the user selected FILE 101a from menu 100 by moving pointing device 2 to FILE 101a. This action caused sub-menu 102 to appear. The user then selected sub-menu choice 102a which caused sub-sub-menu 104 to appear. The user then moves pointing device 2 to choice 104a and sub-sub-sub-menu 106 appears. As is shown, the user has pointing device 2 on the "delete" item 106a. The user now has the option of either lifting pointing device 2 from the surface of touch panel 14 and commit to the command or create a place-holder at that location. Such a place-holder can be created by the ways described above. The user also has the option to move pointing device 2 to the "cancel" selection on any menu or sub-menu and lift it from the surface of touch panel 14 to commit the cancel command and remove the menu presently on the screen. The complex command in the pull-down menu shown in FIG. 6b operates the same as the pie-menu shown in FIG. 6a and will not be further discussed herein.

Figure 6C:
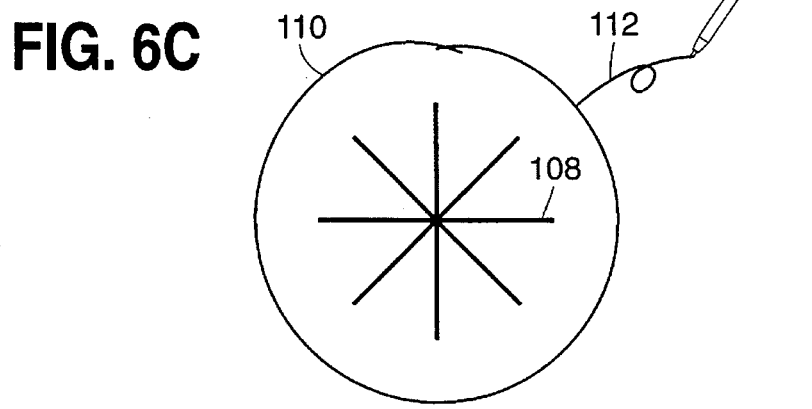
FIG. 6c illustrates a complex command consisting of two gestures.

In order to select an item or object in most touch based systems, the user encloses it with a circle. That is, the select gesture is defined by a circle. "Delete" is defined by a curled line much like that used by a person who wishes to delete text. In FIG. 6c, the user has selected object 108 by drawing a circle 110 around it with pointing device 2 and has also drawn a curled line 112 to cause the program to "delete" object 108. The user however has not lifted pointing device 2 from the surface of touch panel 14 to commit to the command. Therefore the user has the option of lifting pointing device 2 from the surface or creating a place-holder to "suspend" the complex command gesture.

Figure 7:
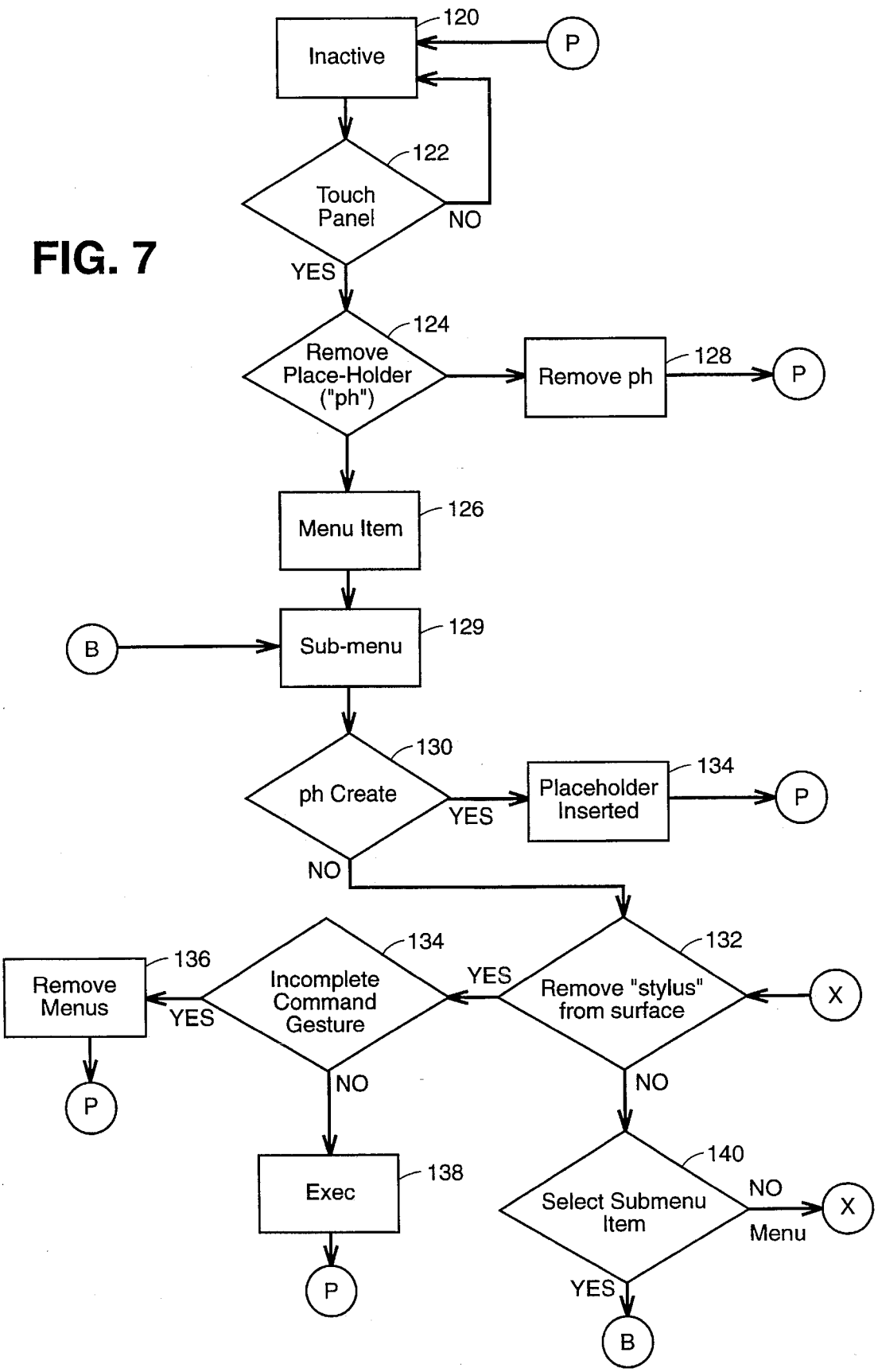
FIG. 7 is a flowchart showing the steps or details of menu operations including the place-holder generating system according to the preferred embodiment of the present invention.

FIG. 7 is a flowchart illustrating the details of menu operations including place-holder creation steps for a menu according to the preferred embodiment of the invention. Like the general flowchart in FIG. 3, touch panel 14 is inactive 120 and will be inactive until the user touches 122 the surface of touch panel 14. The user can either choose to remove 124 a place-holder or select a menu item 126. If the user chooses to remove a place-holder, the one chosen will be removed 128 and the surface of touch panel 14 is inactive 120 once again. Otherwise the user selects a menu item 126 by touching that item. A sub-menu 129 will appear, and the user will have the option of either creating a place-holder 130 or removing 132 the pointing device 2 from the surface of touch panel 14. A place-holder will be created when the pointing device is held in place for greater than a predetermined time (t) and will be removed in the same manner.

If the user chooses 130 to create a place-holder, one will be created 134 and the surface of the touch panel will generally be inactive 120 for some time. If the user does not want a place-holder, the user can remove 132 the pointing device 2 from the surface of touch panel 14. If he/she removes the pointing device 2, a command may not necessarily be committed. That is an incomplete command may have been chosen. For example, an item such as "margins" selected from a third sub-menu may require a selection from the next sub-menu to commit to a specific command. If the user removes pointing device 14 from such an incomplete command 134, the menu is removed 136 entirely and the surface of touch panel 14 becomes inactive 120. If the command is complete, it will be executed 138 and the touch panel 14 becomes inactive.

Now, if the user does not remove 132 the pointing device from touch panel 14, then the user has the option of selecting a sub-menu item 140 and returning to 128 where the sub-menu becomes visible or remove the stylus from touch panel.

Figure 8:
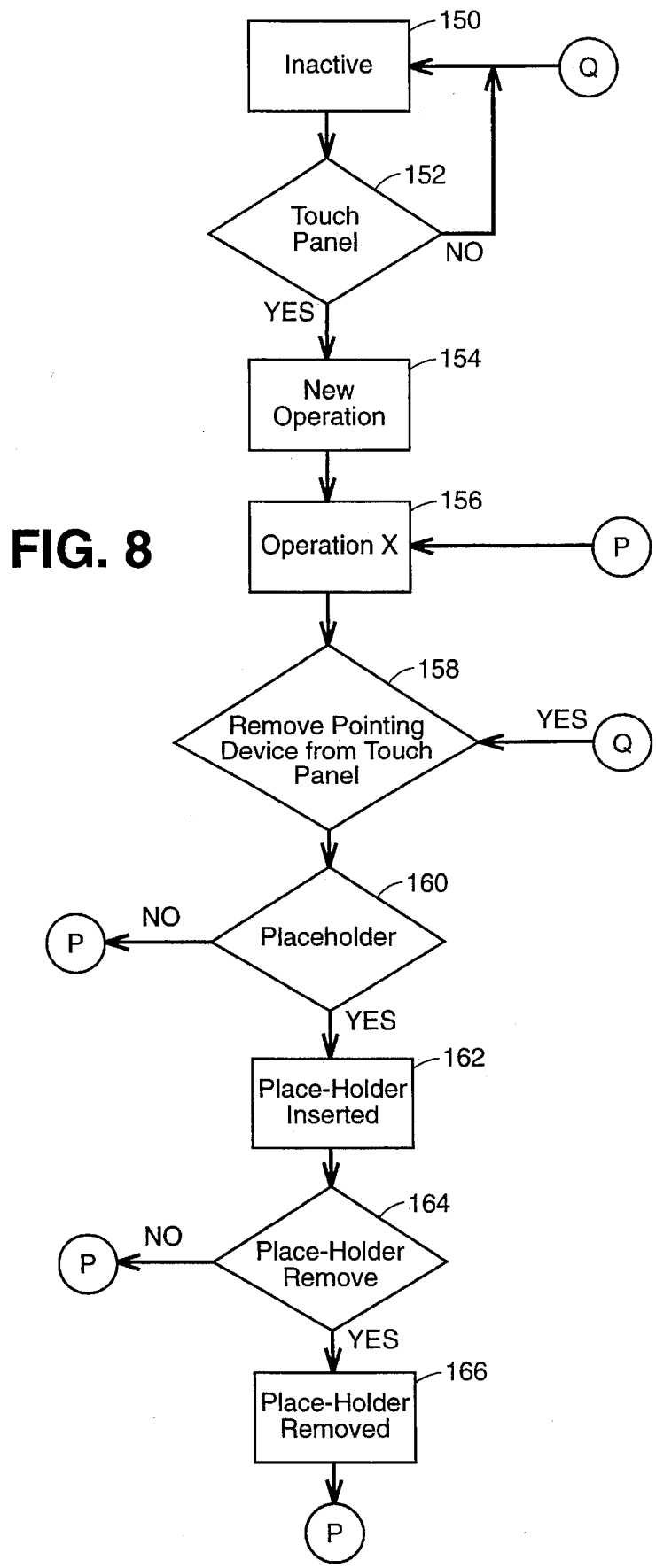
FIG. 8 is a flowchart showing the steps or details of file operations including the place-holder generating system according to the preferred embodiment of the present invention.

FIG. 8 is a flowchart illustrating the details of file operations including place-holder creation steps for a drawing gesture command according to the preferred embodiment of the invention. Like the general flowchart in FIG. 3, touch panel 14 is inactive 150 until it is touched 152 by a user. The user selects a new operation 154 from the menu selection. The user can also retrieve an existing operation already in memory to work on. The user then performs operation (X) 156 which may include drawing objects or gestures or both. The user may then remove 158 pointing device 2 from the surface of touch panel 14. If the user does remove pointing device 14, the surface becomes inactive 150 again. If the user continues however, he/she has the choice 160 of creating a place-holder. If the user chooses not to create a place-holder he/she will continue with operation (X) 156. If however the user chooses to create a place-holder, one will be created 162 for either an object or complex gesture drawn. The user will then have the option of removing 164 a place-holder. If the user chooses to remove the place-holder, it will be removed 166 and the user will continue with operation (X) 156. Otherwise the place-holder will remain and the user will continue with operation (X) 156.

The place-holder described above has many applications. For example, in any application or document, touching the screen for some length of time leaves a visible place-holder or virtual stylus which can serve as a bookmark in any document, and the system can support searches for these markers, especially if each one is given a unique identifier. These identifiers are also useful in user interface error recovery. Since the system cannot prevent the user from physically untouching the screen, the user can make incomplete or nonsensical gestures. When the user then untouches, the system can ignore the untouch and install a virtual stylus. By touching the virtual stylus, the user resumes control at the point of error and the untouch/touch pair is ignored. The user can now cancel or clarify the action intended.

Although not specifically illustrated in FIGS. 3, 7 and 8, the flowchart elements include the steps of storing the coordinates of the data created by the user (gesture, object and/or place-holder) where necessary. The coordinates of the data created by the user are stored in memory 24 shown in FIG. 1.

Although the invention has been described with reference to preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

We claim:

1. A computer system in which execution of a selected command may be suspended, comprising:

a data interface surface;

a first application program including means for displaying data on said surface;

input means interacting with said surface for inputting data on said surface and for inputting commands on said surface to control said first application program and to modify said data displayed on said surface;

place holder means, responsive to said input means, for storing information identifying at least one command input through said input means and for suspending execution of said at least one command during which time said input means may be used to input data or other commands; and command enablement means, responsive to subsequent interacting of said input means with said surface, for retrieving said information identifying said at least one suspended command and for selectively enabling execution, clarification and cancellation of said at least one suspended command.

2. The system according to claim 1 wherein said place holder means comprises means for suspending execution of said at least one command in response to maintenance of said input means with said surface for a predetermined time duration.

3. The system according to claim 2 further comprising means for selectively changing the length of said predetermined time duration.

4. The system according to claim 1 further comprising memory means for storing data displayed on said data interface surface and selected to be modified by execution of said at least one command and for storing coordinates of said selected data.

5. The system according to claim 4 further comprising means for removing said selected data from said surface after said selected data and said coordinates of said selected data have been stored.

6. The invention according to claim 4 further comprising means for retrieving said selected data and said coordinates of said selected data from said memory means and for displaying said selected data on said surface at said selected data coordinates.

7. The system according to claim 1 wherein said input means for inputting commands comprises means for displaying on said surface at least one menu having a plurality of commands.

8. The system according to claim 1 wherein said place holder means includes means for providing on said surface a visual identification of said at least one command.

9. The system according to claim 9 wherein said command enablement means includes means for removing from said surface said visual identification in response to subsequent interacting of said input means with said surface.

10. The system of claim 1 wherein said data interface surface has identifiable coordinates, said commands are input through said input means at given coordinates on said surface, said information identifying said at least one command and stored by said place holder means comprises coordinates of said at least one command, and said command enablement means is responsive to subsequent interacting of said input means with said surface at said stored coordinates.

11. The system of claim 10 wherein said place holder means includes means for providing on said surface a visual identification of said coordinates of said at least one command.

12. A graphic editing system in which execution of a selected command may be suspended during selection and execution of other commands, comprising:

a data interface surface having identifiable coordinates;

a first application program including means for displaying data on said surface;

first means interacting with said surface for inputting data on said surface and for inputting commands at given coordinates on said surface to control said first application program and to modify said data displayed on said surface;

second means for storing coordinates of at least once command input through said first means, for providing on said surface a visual identification of said stored coordinates of said at least one command, and for suspending execution of said at least one command during selection and execution of one or more other commands in said first application program or in a second application program; and third means responsive to subsequent interaction of said first means with said surface at said stored coordinates for removing said visual identification from said surface and for enabling execution, clarification or cancellation of said at least one suspended command.

13. A graphic editing system comprising:

a data interface surface having identifiable coordinates;

means for displaying data on said surface and interacting with said data;

first means for inputting commands at given coordinates on said surface to modify all or some of said data displayed on said surface;

second means for storing coordinates of at least one command input through said first means and for providing a visual identification of said stored coordinates such that said coordinates remain stored and said visual identification is maintained during the input of subsequent commands at coordinates other than said stored coordinates; and means responsive to subsequent interaction with said surface at said stored coordinates for removing said visual identification.

14. A computer system in which execution of a selected command in a first application program may be suspended to perform one or more commands in a second application program, the system comprising:

a data interface surface having identifiable coordinates;

first and second application programs including means for selectively displaying first and second data, respectively, on said surface;

input means interacting with said surface for inputting data on said surface and for inputting commands at given coordinates on said surface to control one of said first and second application programs currently displaying said first or second data, respectively, on said surface and to modify said first or second data, respectively, on said surface;

place holder means for storing coordinates of at least one command in said first application program input through said input means and for providing a visual display of the location of said coordinates or a visual display of said at least one command;

said place holder means further comprising means for enabling interaction of said input means with said surface in said second application program at coordinates different than said stored coordinates while retaining said stored coordinates of said at least one command input in said first application program.

15. The system according to claim 14 further comprising means responsive to subsequent interaction of said input means with said surface in said first application program for removing said visual display.

16. The system according to claim 14 wherein said place holder means stores said coordinates of said at least one command in response to maintenance of said input means with said surface at said coordinates for a predetermined time.

17. The system according to claim 16 further comprising means for selectively changing the length of said predetermined time.

18. The system according to claim 14 further comprising memory means for storing first data displayed on said data interface surface and selected to be modified by execution of said at least one command.

19. The system according to claim 18 further comprising means for removing said selected first data from said surface after said selected first data and said coordinates of said at least one command have been stored.

20. The system according to claim 19 further comprising means for retrieving said selected first data from said memory means and displaying said selected first data on said surface.

21. A system in which multiple commands may be selected in a first order and executed in a second order, said system comprising:

(a) first means responsive to a first user action for selecting a first command, (b) second means responsive to a second user action for executing said first command, (c) third means responsive to a third user action taken immediately following the first user action for suspending execution of said first command, preserving said first command, and allowing a user to select and execute one or more different commands, and (d) fourth means responsive to a fourth user action for restoring said first command and allowing the user to take said second action to execute said first command.

22. The system according to claim 21 further comprising fifth means responsive to the third user action for indicating that the system has been placed in a suspended condition with respect to execution of said first command.

23. A graphic editing system capable of operating in first and second command selected modes, in which commands are selected but unexecuted in said first command selected mode and commands are both selected and executed in said second command selected mode, the system comprising:

means for executing a selected command in response to a first user action;

place holder means responsive to a second user action for creating a virtual place holder for maintaining the condition of the system in said first command selected mode while allowing operation in said second command selected mode and for indicating said condition; and means for terminating said virtual place holder.

24. The system according to claim 23 further comprising means for allowing said first user action to be maintained on a screen display, and wherein said place holder means creates said virtual place holder after said first user action has been maintained at a given screen location for a given time, wherein said place holder means indicates said condition by creating a visible indication at said given screen location, and wherein said place holder means stores said given screen location for subsequent retrieval.

25. The system according to claim 24 further comprising means responsive to a further user action at said screen location or visible indication for restoring the system to said first command selected mode.

26. In a system including a data interface surface having identifiable coordinates, input means interacting with said surface, and a first application program including means for displaying data on said surface, a method for suspending execution of a selected command to allow selection and execution of other commands, comprising:

interacting with said surface using said input means to select at least one command at given coordinates on said surface to control said first application program or to modify all or some of said data displayed on said surface;

storing coordinates of said at least one command;

suspending execution of said at least one command;

allowing further interacting with said surface to select and execute one or more other commands while said at least one command remains suspended; and selectively enabling execution, clarification and cancellation of said at least one command in response to subsequent interacting of said input means with said surface at said stored coordinates.

27. A computer usable medium having computer readable program code means embodied in said medium for causing said computer to perform method steps for suspending execution of a selected command to allow selection and execution of other commands, said method steps comprising:

interacting with a data interface surface connected to said computer to select at least one command to control a first application program operating on said computer or to modify data displayed on said surface;

storing information identifying said at least one command;

suspending execution of said at least one command;

allowing further interacting with said surface to select and execute one or more other commands while said at least one command remains suspended; and in response to subsequent interacting with said surface, retrieving said information identifying said at least one command and selectively enabling execution, clarification and cancellation of said at least one command.

28. The computer usable medium of claim 27 wherein said program code means causes said computer to perform the further steps of:

providing on said surface a visual identification of said at least one command; and removing from said surface said visual identification in response to subsequent interacting with said surface.

29. The computer usable medium of claim 28 wherein said information identifying said at least one command comprises coordinates on said surface of said at least one command, and wherein said visual identification is provided at said coordinates.

\* \* \* \* \*